(12) United States Patent
Robinson et al.

(10) Patent No.: US 6,544,435 B2
(45) Date of Patent: Apr. 8, 2003

(54) COMPOSITION AND METHOD OF FORMATION AND USE THEREFOR IN CHEMICAL-MECHANICAL POLISHING

(75) Inventors: Karl M. Robinson, Boise, ID (US); Whonchee Lee, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/167,564

(22) Filed: Jun. 11, 2002

(65) Prior Publication Data

US 2002/0185628 A1 Dec. 12, 2002

Related U.S. Application Data

(63) Continuation of application No. 09/252,022, filed on Feb. 16, 1999, now Pat. No. 6,409,936.

(51) Int. Cl.[7] .............................................. C09K 13/00
(52) U.S. Cl. ........................ 252/79.1; 438/692; 438/693
(58) Field of Search ......................... 252/79.1; 438/692, 438/693

(56) References Cited

U.S. PATENT DOCUMENTS

| | | | |
|---|---|---|---|
| 4,070,797 A | 1/1978 | Griesshammer et al. ...... 51/326 |
| 4,156,619 A | 5/1979 | Griesshammer ............... 134/2 |
| 4,563,257 A | 1/1986 | Sova ....................... 204/129.85 |
| 4,724,042 A | 2/1988 | Sherman ..................... 156/637 |
| 5,193,316 A | 3/1993 | Olmstead ................. 51/281 SF |
| 5,320,706 A | 6/1994 | Blackwell .................... 156/636 |
| 5,489,233 A | 2/1996 | Cook et al. ..................... 451/41 |
| 5,584,146 A | 12/1996 | Shamouillan et al. ......... 51/293 |
| 5,616,212 A | 4/1997 | Isobe ........................... 438/693 |
| 5,704,987 A | 1/1998 | Huynh et al. ................... 134/6 |
| 5,738,800 A | 4/1998 | Hosali et al. ................. 216/99 |
| 5,759,917 A | 6/1998 | Grover et al. .......... 438/693 X |
| 5,930,645 A | 7/1999 | Lyons et al. ................ 438/424 |
| 6,046,112 A | 4/2000 | Wang ........................... 438/693 |
| 6,120,571 A | 9/2000 | Aihara et al. ................. 51/309 |

OTHER PUBLICATIONS

*McGraw–Hill Concise Encyclopedia of Science & Technology*, Fourth Edition, (1998), pp. 1931–1932.
Hiemenz, Paul.C., *Principles of Colloid and Surface Chemistry*, 2nd ed., Marcell Dekker, Inc., New York, (1986), 428–435.

*Primary Examiner*—Felisa Hiteshew
(74) *Attorney, Agent, or Firm*—Schwegman, Lundberg, Woessner & Kluth, P.A.

(57) ABSTRACT

A composition and method of construction and use therefor in chemical-mechanical polishing ("CMP") of one or more substrate assemblies is described. More particularly, a polishing solution comprising etchant, abrasive particles, and surfactant and methods of mixing to form and to dispense the polishing solution are described. One or more of the etchant, abrasive particles, and/or surfactant may comprise a liquid medium. Etchant, surfactant or abrasive particles may be premixed, mixed in-situ ("point of use mixing"), or any combination thereof. The surfactant may be ionic or nonionic. In particular, a polyoxyethylene may be used, and more particularly, a polyoxyethylene ester or ether may be used.

49 Claims, 8 Drawing Sheets

COMPOSITION AND METHOD OF FORMATION AND USE THEREFOR IN CHEMICAL-MECHANICAL POLISHING

The present application is a continuation application of Ser. No. 09/252,022, filed Feb. 16, 1999, now issued as U.S. Pat. No. 6,409,936.

FIELD OF THE INVENTION

The present invention relates generally to compositions and their formation and use, and more particularly relates to a polishing solution for chemical-mechanical polishing ("CMP") for forming an integrated circuit.

BACKGROUND OF THE INVENTION

In CMP, a substrate assembly is positioned on a CMP pad located on a platen or web. By substrate assembly, it should be understood to include a substrate having one or more layers and/or features formed thereon and/or therein. A wafer carrier is used to apply a downward force to push the substrate assembly against the CMP pad. The CMP pad and the substrate assembly are moved against, and relative to, one another, while applying the downward force to effect material removal. Polishing solution, containing polishing particulate to facilitate material removal, is dispensed on the CMP pad. The polishing solution conventionally is chemically reactive to remove unwanted material more rapidly than other material on the substrate assembly. This chemical reactivity may be changed during CMP processing.

Accordingly, CMP may be used to planarize a surface of a substrate assembly. Furthermore, CMP may be used to remove a layer of material in order to expose an underlying layer. Conventionally, the underlying layer is a "stop" layer. By "stop" layer, it is meant CMP for the underlying substance significantly slows removal of material; in other words, the CMP process is selective to the underlying layer or substance.

A polishing solution is described in U.S. Pat. No. 5,738,800 to Hosali et al. In Hosali et al., a polishing solution is described as having an aqueous medium, abrasive particles ("colloidal ceria"), a surfactant ("potassium hydrogen phthalate" or "KHP"), a compound which complexes with silicon dioxide ("silica" or "$SiO_2$") and silicon nitride ("$Si_3N_4$"), and a composition to adjust pH levels ("potassium hydroxide" or "KOH"). Thus, such a solution may be adjusted to have a substantially neutral pH. By substantially neutral pH, it is conventionally meant a pH in a range of about 6.0 to 6.5.

Two pH neutral adjusted polishing solutions from Rodel of Newark, Del., under the names of CSC5105-DV and CSC5005-ES were used in CMP processes to form shallow-trench isolation ("STI") structures in substrate assemblies. The substrate assemblies were being processed to provide a plurality of dynamic random access memories ("DRAMs") having a memory array with about a 210 nm half-pitch. However, there were a significant number of defects, such as scratches, in the substrate assemblies.

Hence, there is a need in the art, especially the art of high-density (210 nm or less half-pitch) integrated circuit manufacture, to provide a polishing solution and process for CMP which reduces the amount of defects.

SUMMARY OF THE INVENTION

It has been discovered by the inventors herein that by adding surfactant to form polishing solution the above-mentioned defects could be reduced. Moreover, it was discovered that by mixing surfactant, abrasive particles, and etchant in various premix and/or point of use mix combinations, differing outcomes would result.

Accordingly, the present invention provides composition and method of formation and use therefor in CMP. More particularly, a polishing solution comprising abrasive particles, etchant, and surfactant is provided, as well as methods of formation and use thereof. The polishing solution may further comprise one or more liquid mediums. An ionic or a nonionic surfactant may be used. More particularly, the nonionic surfactant may be a polyoxyethylene, such as a polyoxyethylene ether or a polyoxyethylene ester. Various embodiments for combining abrasive particles, etchant, and surfactant by point of use mixing, premixing, and combinations thereof are described herein with associated settling and turbidity rates.

BRIEF DESCRIPTION OF THE DRAWING(S)

Features and advantages of the present invention will become more apparent from the description of the preferred embodiment(s) described below in detail with reference to the accompanying drawing(s) where.

Reference numbers refer to the same or equivalent parts of embodiment(s) of the present invention throughout the several figures of the drawing.

DESCRIPTION OF THE PREFERRED EMBODIMENT(S)

In the following detailed description of the preferred embodiments, reference is made to the accompanying drawings which form a part of this disclosure, and which, by way of illustration, are provided for facilitating understanding of specific embodiments in accordance with the present invention described herein. However, it is to be understood that other embodiments may be practiced without departing from the scope of the present invention. The following described embodiment(s) of the present invention are directed to polishing solutions for CMP to form STI structures for DRAMs. Some conventional details with respect to CMP, STI, and DRAMs are omitted to more clearly describe the present invention.

Figure 1:
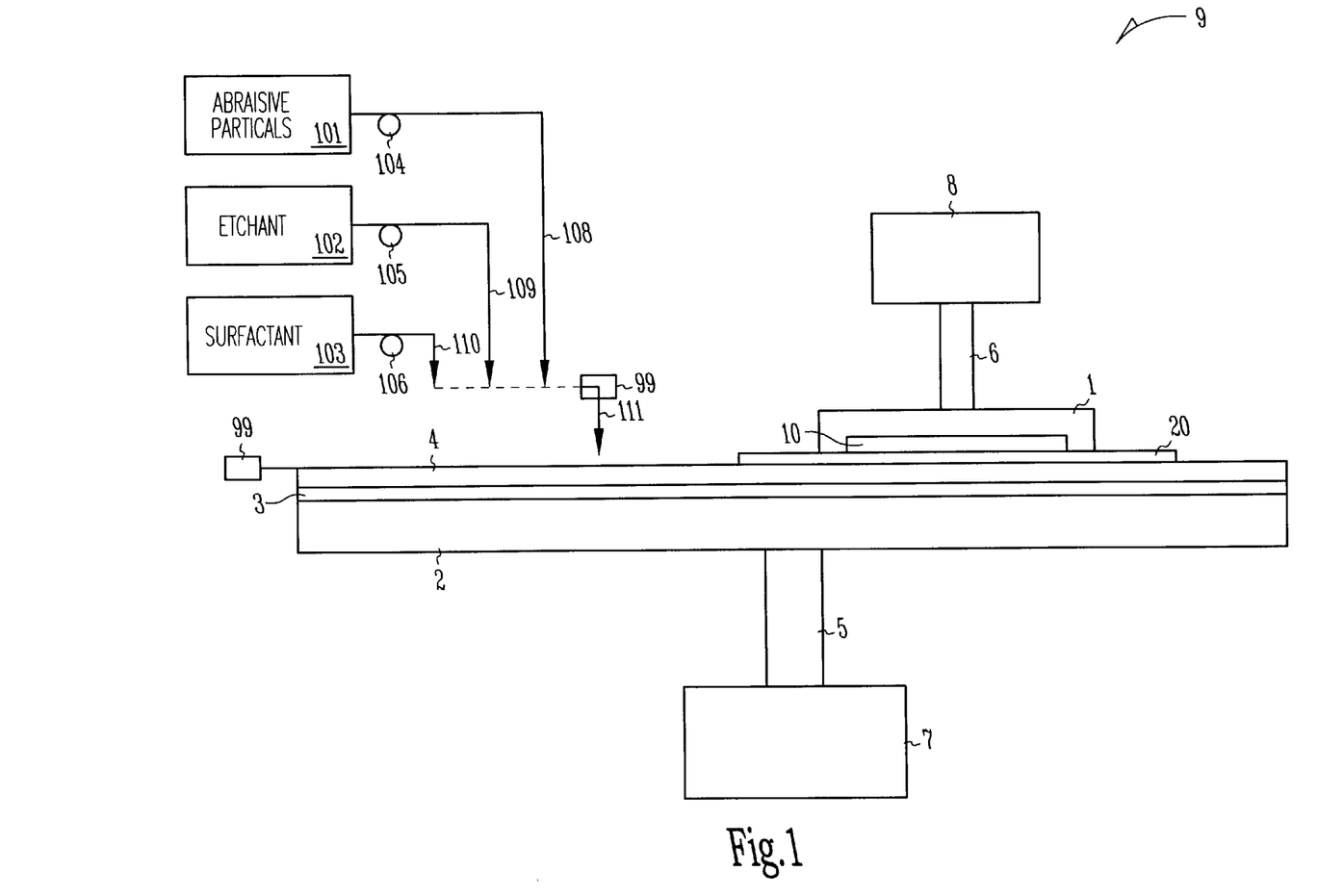
FIG. 1 is a cross-sectional view of an exemplary portion of an embodiment of a CMP system in accordance with the present invention.

Referring to FIG. 1, there is shown a cross-sectional view of an exemplary portion of CMP system 9 employing polishing solution 20 in accordance with the present invention. CMP system 9 comprises: wafer carrier assembly 1, platen 2, under-pad 3, CMP pad 4, CMP pad drive shaft 5, wafer drive shaft 6, motor 7, and motor/downward force applicator/sensor assembly 8, all of which are conventional.

Moreover, CMP pad 4 may be a conventional porous pad, or a less conventional non-porous pad as is described in U.S. Pat. No. 5,489,233 to Cook et al. Wafer carrier assembly 1 maintains substrate assembly 10 in position for CMP in a well-known manner. Polishing solution 20 of the present invention is applied to CMP pad 4 for removing material from substrate assembly 10. Though a conventional platen CMP system 9 is illustratively shown, it should be appreciated by those of ordinary skill in the art that the present invention may be used with a web-based CMP system. In a web-based CMP system, a webbing is moved between two locations, conventionally by feed and take-up rollers. The webbing takes the place of a CMP pad, and like a CMP pad, the webbing may be configured with fixed abrasives, grooves, or other CMP pad configurations.

Polishing solution 20 in accordance with the present invention comprises abrasive particles 101, etchant 102, and surfactant 103. It should be understood that a liquid medium may be used with abrasive particles 101, etchant 102, or surfactant 103. Such a liquid medium may be an aqueous solution. Moreover, though pumps are shown for the embodiments described herein, it should be understood that gravity, air pressure, or other forms of more passive feed systems may be used.

There are several embodiments for mixing abrasive particles 101, etchant 102, and surfactant 103. Each of these embodiments have associated settling and turbidity rates. It was discovered that degree to which abrasive particles 101 settle affects CMP performance. Furthermore, it was discovered that generally a faster settling rate yielded better results. Accordingly, in-line turbidity monitor 99 may be used to ensure proper settling has occurred. Alternatively, turbidity monitor 99 may be operatively coupled to receive polishing solution off of CMP pad 4. Moreover, turbidity monitors 99 may be used in both locations, namely, in-line and off-pad. By 100 percent turbidity, it is meant that approximately no light is transmitted through a mixture. By 50 percent turbidity, it is meant that approximately half of the light is transmitted through the mixture.

In one embodiment, abrasive particles 101, etchant 102, and surfactant 103 are pumped by pumps 104, 105, and 106, respectively, through feed-tubes 108, 109, and 110, respectively, onto CMP pad 4 for point of use mixing. Alternatively, feed-tubes 108, 109, and 110 may be coupled to feed-tube 111 for point of use mixing on CMP pad 4. In the embodiment illustratively shown in FIG. 1, abrasive particle 101 settling rate was in a range of approximately 0 to 60 minutes with a turbidity of approximately 100 to 50 percent. While not wishing to be bound by theory, it is believed that while waiting for abrasive particles 101 to settle, etchant 102 and surfactant 103 in combination tend to degrade. Accordingly, a more rapid settling rate may be more desirable to avoid such degradation. In the embodiment of FIG. 1, degradation of etchant 102 and surfactant 103 was observed.

Figure 1A:
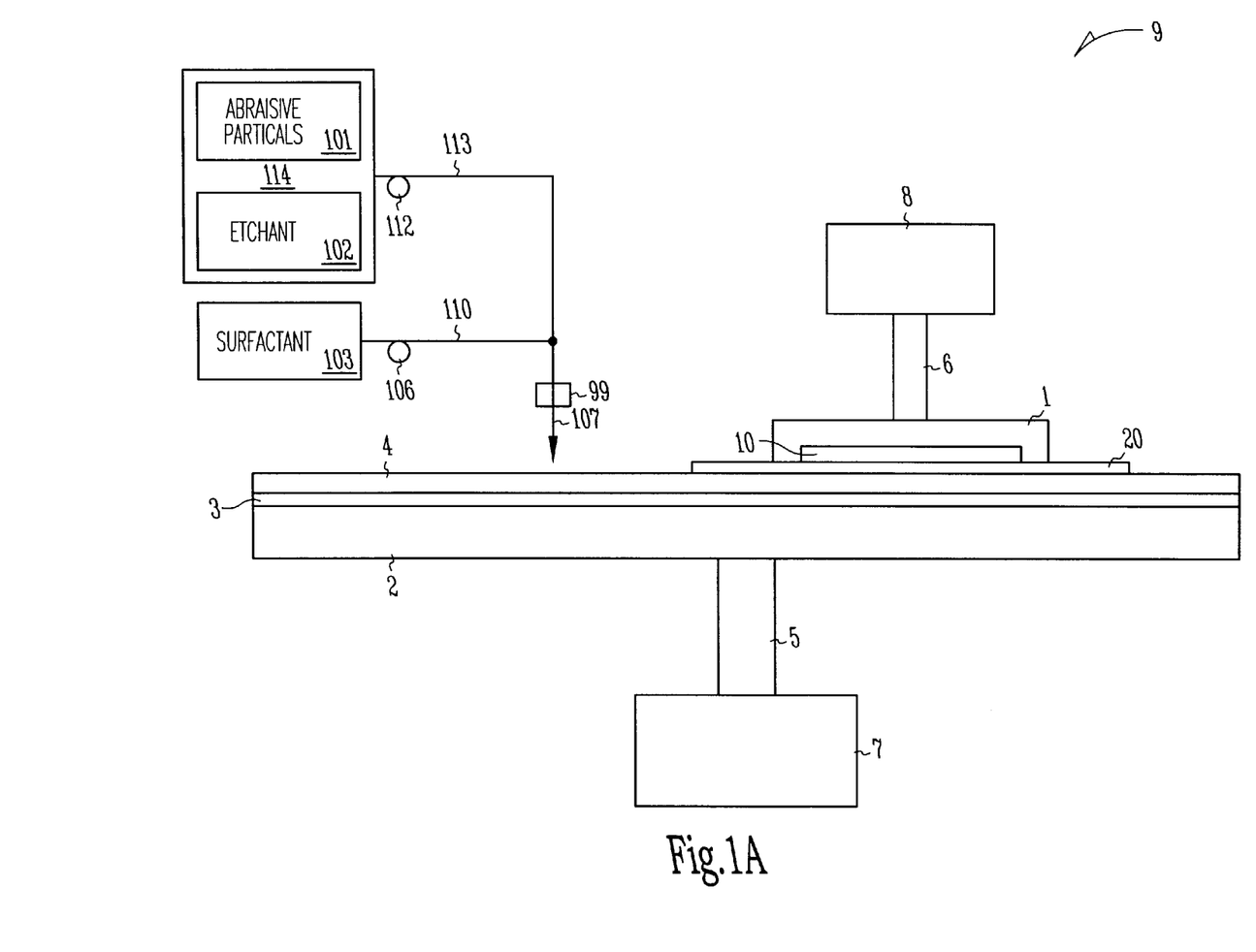
FIGS. 1A–1E are respective alternative embodiments of the CMP system shown in FIG. 1.

Referring to FIG. 1A, there is shown an alternative embodiment to CMP system 9 shown in FIG. 1. In this embodiment, abrasive particles 101 and etchant 102 are premixed prior to pumping by pump 112. This combination is pumped from vessel 114 through feed-tube 113 for point of use mixing with surfactant 103. Though feed-tubes 110 and 113 are shown as coupled to feed-tube 107, it should be understood that feed-tubes 113 and 110 need not be coupled for point of use mixing directly on CMP pad 4. Abrasive particles 101 settling rate for this embodiment was in a range of approximately 0 to 30 minutes for a turbidity in a range of approximately 100 to 50 percent. In this embodiment, it was observed that there was little to no degradation of etchant 102 and surfactant 103.

Figure 1B:
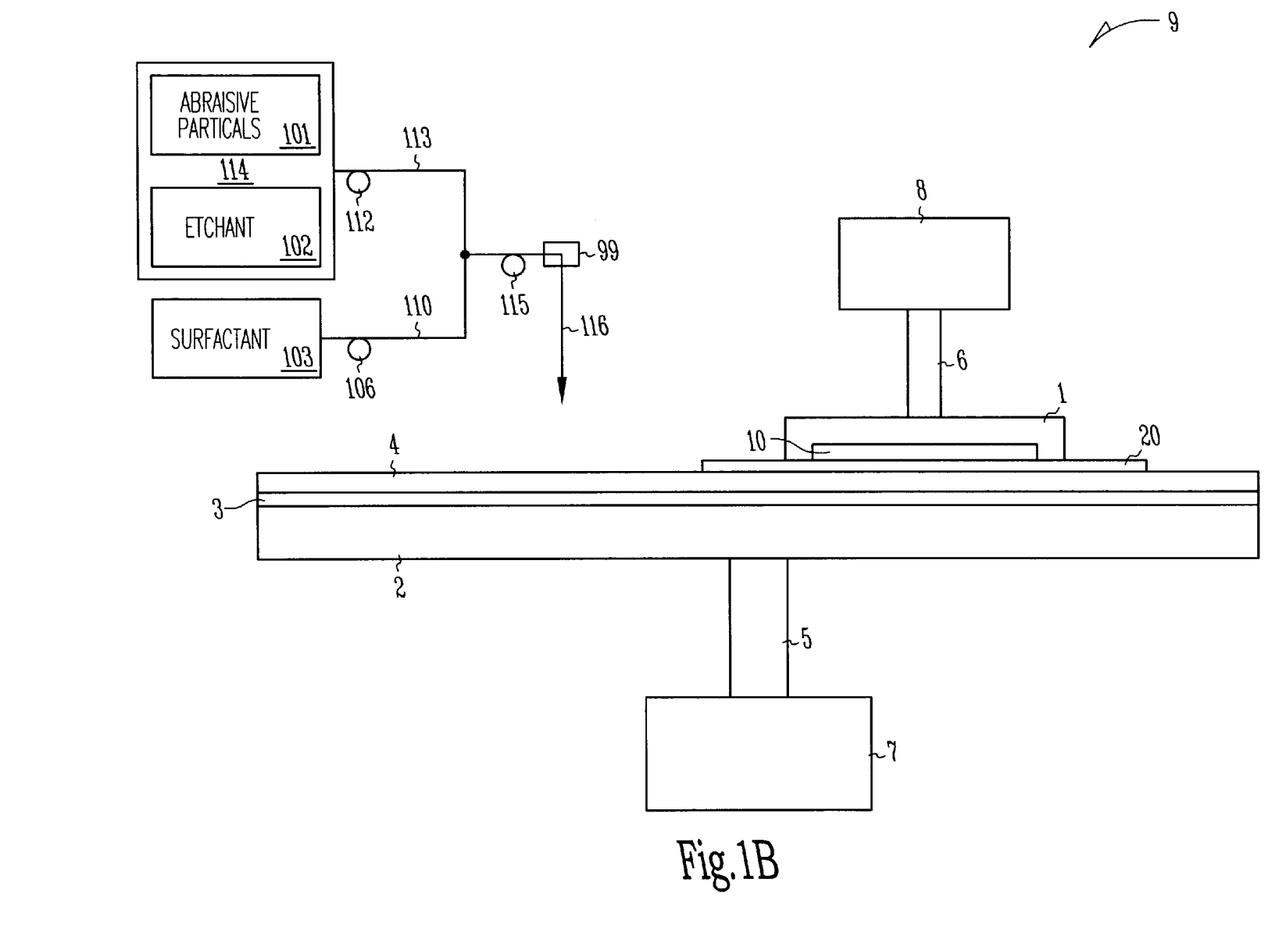

In an alternative embodiment to that illustratively shown in FIG. 1A, premixed abrasive particles 101 and etchant 102 are premixed with surfactant 103 for pumping onto CMP pad 4, as illustratively shown in FIG. 1B. In the embodiment shown in FIG. 1B, feed-tubes 113 and 110 are coupled for premixing, and then premixed abrasive particles 101, etchant 102, and surfactant 103 are pumped by pump 115 through feed tube 116 onto CMP pad 4. Abrasive particles 101 settling rate for this embodiment was in a range of approximately 0 to 30 minutes for a turbidity in a range of approximately 100 to 50 percent. In this embodiment, it was observed that there was little to no degradation of etchant 102 and surfactant 103.

Figure 1C:
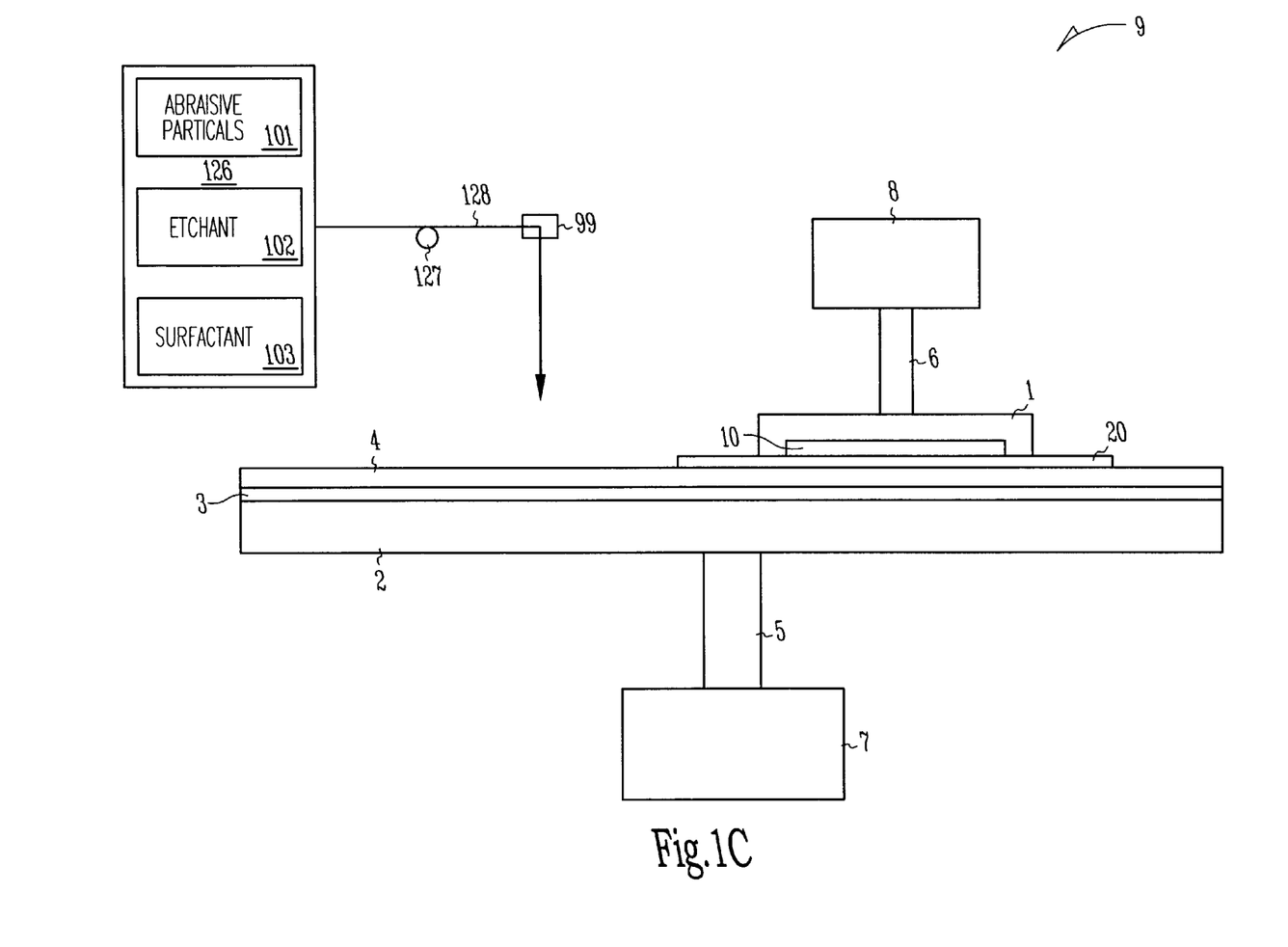

In FIG. 1C, there is shown an alternative embodiment to that shown in FIG. 1B for premixing abrasive particles 101, etchant 102, and surfactant 103. Abrasive particles 101, etchant 102, and surfactant 103 are premixed prior to being pumped from vessel 126 by pump 127 through feed-tube 128. Abrasive particles 101 settling rate for this embodiment was in a range of approximately 0 minutes to 5 hours for a turbidity in a range of approximately 100 to 50 percent. In this embodiment, it was observed that there was some degradation of etchant 102 and surfactant 103.

Figure 1D:
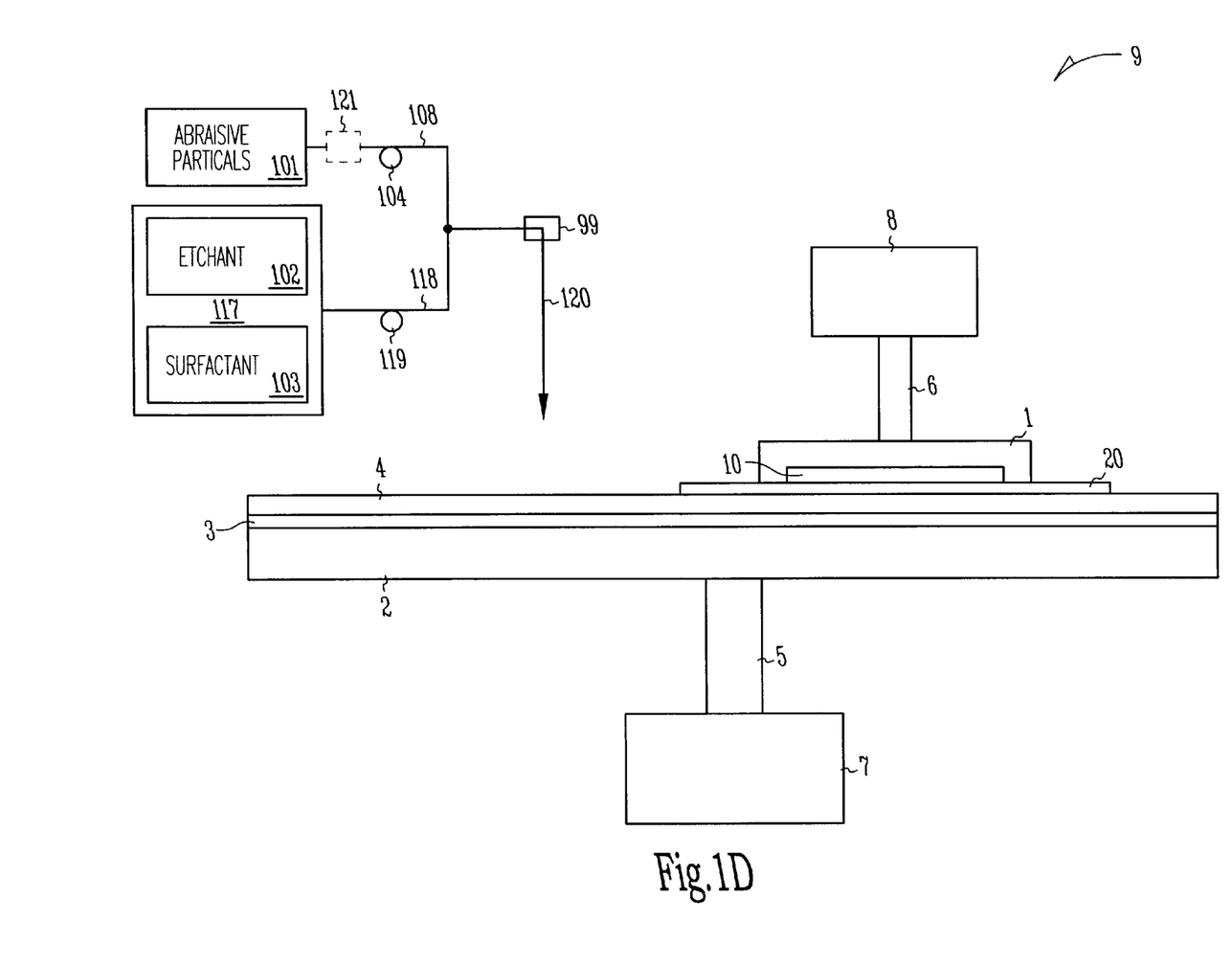

In FIG. 1D, there is shown an alternative embodiment to CMP system 9 shown in FIG. 1. In FIG. 1D, there is shown an embodiment for premixing etchant 102 and surfactant 103 with point of use mixing of abrasive particles 101. Etchant 102 and surfactant 103 are premixed prior to being pumped from vessel 117 by pump 119 through feed-tube 118. Optionally, inline filter 121 may be used to limit the size of abrasive particles 101 for polishing solution 20. Abrasive particles 101, and etchant 102 and surfactant 103 in combination are point of use mixed at the intersection of feed-tubes 108, 118 and 120. Abrasive particles 101 settling rate for this embodiment was in a range of approximately 0 to 60 minutes for a turbidity approximately in a range of approximately 100 to 50 percent. In this embodiment, it was observed that there was some degradation of etchant 102 and surfactant 103.

Figure 1E:
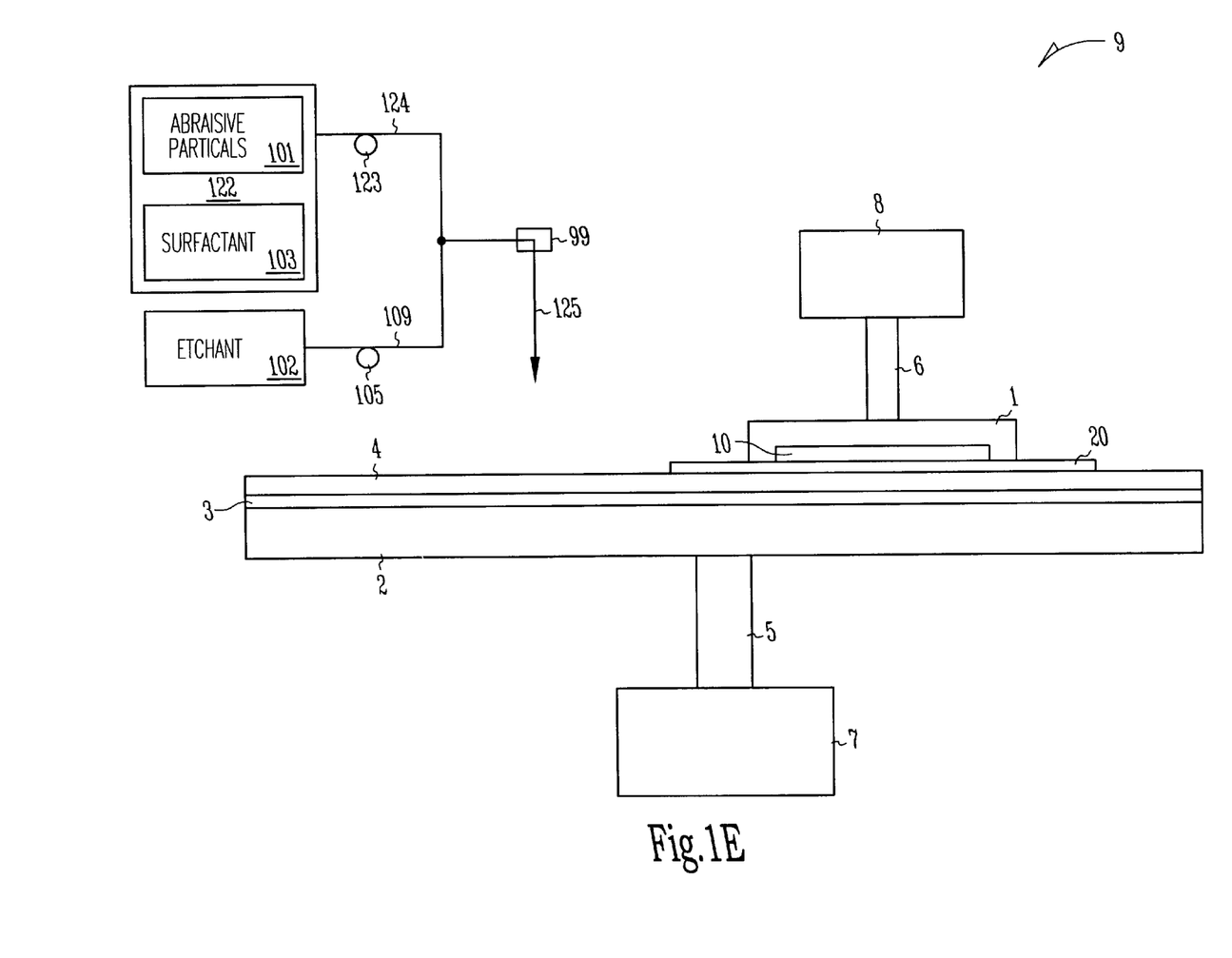

In FIG. 1E, there is shown an embodiment for premixing abrasive particles 101 and surfactant 103 with point of use mixing of etchant 102. Abrasive particles 101 and surfactant 103 are premixed prior to being pumped from vessel 122 by pump 123 through feed-tube 124. Abrasive particles 101 and surfactant 103 in combination, and etchant 102 are point of use mixed at the intersection of feed-tubes 105, 124 and 125. Abrasive particles 101 settling rate for this embodiment was in a range of approximately 0 to 2 minutes for a turbidity in a range of approximately 100 to 50 percent. In this embodiment, it was observed that there was degradation of etchant 102 and surfactant 103.

Figure 2:
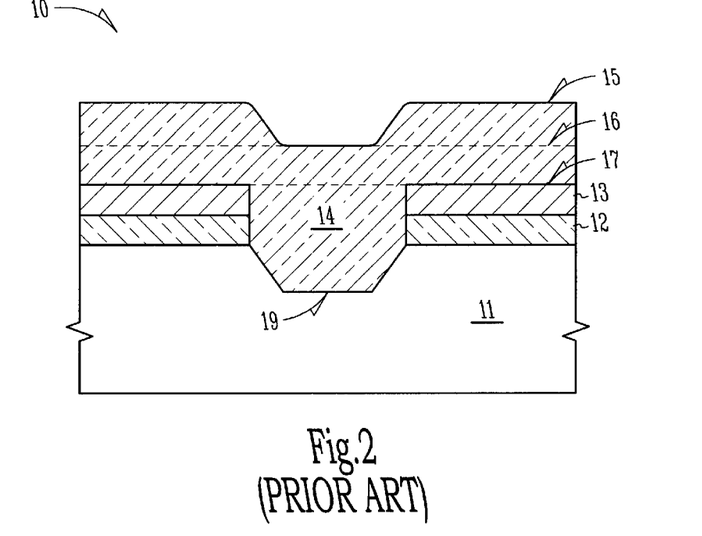
FIG. 2 is a cross-sectional view of an exemplary portion of an embodiment of a substrate assembly having a STI structure of the prior art.

Referring to FIG. 2, there is shown a cross-sectional view of an exemplary portion of an embodiment of substrate assembly 10 of the prior art. Substrate assembly 10 comprises substrate 11, and dielectric layers 12, 13 and 14. Substrate 11 may be a semiconductive material, such as silicon, germanium, and gallium arsenide, among others. In this embodiment, substrate 11 is single crystalline silicon having acceptor impurities ("p-type") added to it.

In an embodiment, dielectric layer 12 is an oxide layer comprising silicon dioxide. Dielectric layer 12 may be deposited on or grown from substrate 11 in a well-known manner. In this embodiment, dielectric layer 13, superposed with respect to dielectric layer 12, is a nitride layer comprising a silicon nitride, such as $Si_3N_4$. Dielectric layer 13 may be deposited in a well-known manner.

A layer of resist (not shown) is superposed with respect to dielectric layer 13. The layer of resist is patterned to define an etch mask. Substrate assembly 10 is then etched to remove portions of dielectric layers 12 and 13, and a portion of substrate 11 to form trench 19. Trench 19 is subsequently filled with dielectric layer 14. In FIG. 2, three levels are identified with respect to dielectric layer 14, namely, upper level 15, "endpoint" level 16, and "CMP stop" level 17.

In this embodiment, dielectric layer 14 is an oxide layer having silicon dioxide. In this embodiment, dielectric layer 14 is formed in two steps. First, a liner layer is thermally grown in well-known manner in trench 19. Second, a silicon dioxide is deposited using a high-density plasma (HDP) in a well-known manner.

Figure 3:
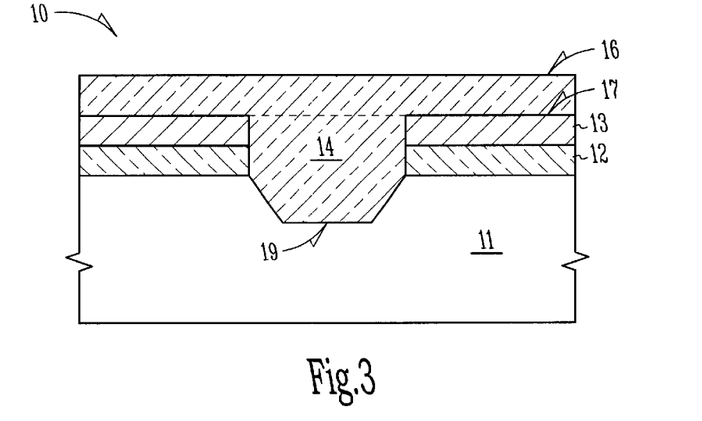
FIG. 3 is a cross-sectional view of the substrate assembly of FIG. 2 after planarization in accordance with the present invention.

FIG. 3 is a cross-sectional view of substrate assembly 10 of FIG. 2 after planarization in accordance with the present invention. CMP is used to remove that portion of dielectric layer 14 from upper level 15 to "endpoint" level 16, as illustratively shown in the cross-sectional view of substrate assembly 10 of FIG. 3. At "endpoint" level 16, dielectric layer 14 has been chemically-mechanically polished to have a planar or a substantially planar surface (planar within plus or minus 10 nm (100 angstroms) and preferably within plus or minus 5 nm (50 angstroms)). Level 16 is termed an "endpoint" level because the amount of force needed to chemically-mechanically polish substrate assembly 10 significantly changes (increases) there. When dielectric layer 14 is polished to level 16, more force is needed owing to material removal across an entire surface region of dielectric layer 14, as opposed to just an elevated portion of it This change in applied force is sensed by CMP system 9 shown in FIG. 1 to provide an endpoint signal (not shown).

The amount of time from starting CMP to reaching endpoint level 16 is measured. This conventionally is referred to as a "polish time" for dielectric layer 14 of substrate assembly 10. As there is some variation in thickness and material properties of dielectric layers from substrate assembly to substrate assembly, not every dielectric layer 14 will have the same "polish time."

A "polish time" for a dielectric layer 14 is used in determining "overpolish" time. After an endpoint level 16 is reached, continued polishing is referred to as an "overpolish" or "overpolishing." A percentage of a "polish time" associated with a dielectric layer 14 is used to determine an amount of "overpolish" time. By way of example and not limitation, if a twenty-percent (20%) "overpolish" were to be performed, total CMP time would be 1.2 times a polish time for a dielectric layer 14 of a substrate assembly 10. An "overpolish" percentage is conventionally determined empirically by periodically measuring a substrate assembly 10 in situ during CMP to determine if a "CMP stop" level 17 has been reached.

Figure 4:
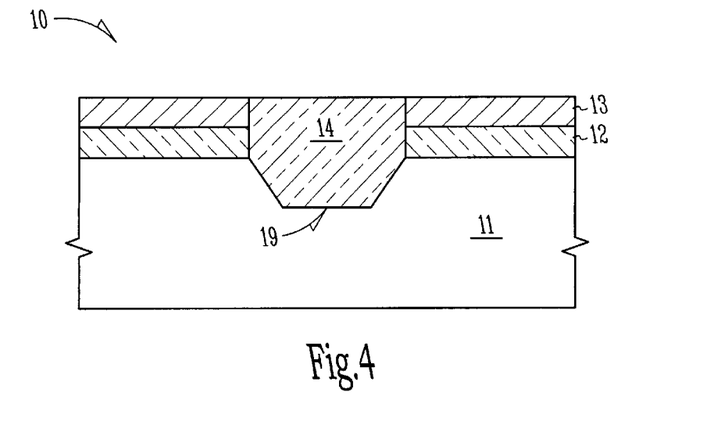
FIG. 4 is a cross-sectional view of the substrate assembly of FIG. 3 after overpolishing in accordance with the present invention.

In FIG. 4, there is shown a cross-sectional view of substrate assembly 10 of FIG. 3 after overpolishing in accordance with the present invention. "CMP stop" level 17 (FIG. 3) has been reached when all or substantially all of dielectric layer 14 superposed with respect to dielectric layer 13 has been removed, as illustratively shown in the cross-sectional view of substrate assembly 10 of FIG. 4. Polishing solution 20 (shown in FIG. 1) removes oxide significantly more rapidly than nitride, namely, polishing solution 20 is selective to nitride over oxide. Thus, when CMP reaches dielectric layer 13, material removal by CMP is substantially slowed. Consequently, dielectric layer 13 functions as a "CMP stop." However, it will be appreciated by those of ordinary skill in the art that some portion of dielectric layer 13 and dielectric layer 14 below "CMP stop" level 17 may be removed during "overpolishing." After CMP of dielectric layer 14, dielectric layer 13 may be removed in a well-known manner. Moreover, dielectric layer 12, as well as a portion of remaining dielectric layer 14, may be removed in a well-known manner.

In CMP of substrate assembly 10, a combination of abrasive particles 101, etchant 102, and surfactant 103 may be used in accordance with the present invention. In an embodiment, a surfactant was added to a "metallic-particle-based slurry." A slurry, such as Brij58 from Rodel, may be used, and a nonionic or an ionic surfactant may be used. By way of example and not limitation, a nonionic surfactant may be hydrocarbon-based, such as a hydrocarbon chain with a hydroxide end group and a methyl end group. In particular, a polyoxyethylene, such as a polyoxyethylene ether or polyoxyethylene ester, may be used. For example, a polyoxyethylene ether of the form: $C_{18}E_{20}=CH_3(CH_2)_{17}$—$(OC_2H_5)_{20}$—OH may be used.

A control group and an experimental group of substrate assemblies were tested. Each substrate assembly was formed from a 200-mm ("8 inch") silicon substrate. Each substrate assembly A, B, C and A', B', C' had a blanket layer of $SiO_2$ superposed on the silicon substrate for CMP. Each such substrate assembly D and D' had a blanket layer of $Si_3N_4$ superposed on the silicon substrate for CMP. Each substrate assembly was placed in a wafer carrier face down such that each dielectric layer was put in contact with a CMP pad for polishing. Each substrate assembly was polished on the same CMP system, namely, a Strasbaugh Model 6DSP CMP system using a Rodel OXP 2000 CMP pad and a Suba 4 underpad. The Strasbaugh Model 6DSP CMP system is a dual headed system; in other words, there are two wafer carrier assemblies for polishing two substrate assemblies simultaneously. Each substrate assembly was polished under conditions of: 5 psi down pressure, 1.0 psi back pressure, 10 rpm wafer carrier rotational speed, 31 rpm platen rotational speed (rotated in the same rotational direction as the wafer carrier), and 75 ml/min. polishing solution flow rate. Prior to each polishing, the CMP pad used was conditioned. Each substrate assembly was polished for 150 seconds.

On the control group of substrate assemblies, Corundum polishing solution from Rodel was used. Results for the control group of substrate assemblies were tabulated, as shown in Table I. On the experimental group of substrate assemblies, Corundum polishing solution from Rodel with 200 PPM of Brij58 added to it in accordance with an embodiment of the present invention was used. Results for the experimental group of substrate assemblies were tabulated, as shown in Table II.

TABLE I

| Substrate Assembly | Amount Removed |
| --- | --- |
| A (oxide) | 5737 Å |
| B (oxide) | 5647 Å |
| C (oxide) | 2672 Å |
| D (nitride) | 44 Å |

Substrate assemblies A and B, and C and D were polished simultaneously, respectively.

Accordingly, it may be seen that removal rates for substrate assemblies A and B, each having a same or substantially same type and thickness of oxide, are substantially the same. Simultaneous polishing of substrate assemblies C and D with essentially equivalent starting thicknesses of oxide and nitride, respectively, indicates that oxide is removed at a less rapid rate when polishing substrate assemblies of non-equivalent hydrophilic qualities. In other words, in view of Table I, oxide removal rate is slower when comparing simultaneous polishing of a wafer with a blanket of oxide and a wafer with a blanket of nitride, as compared to simultaneous polishing of wafers each with a blanket of oxide.

Simultaneous polishing of substrate assemblies A' and B', and C' and D', respectively, with polyoxyethylene ether added to Corundum polishing solution in accordance with an embodiment of the present invention produced the results summarized in Table II:

TABLE II

| Substrate Assembly | Amount Removed |
| --- | --- |
| A' (oxide) | 2277 Å |
| B' (oxide) | 2367 Å |
| C' (oxide) | 2443 Å |
| D' (nitride) | 18 Å |

Substrate assemblies A', B' and C' have an approximately the same removal rate.

In this embodiment of the present invention, a substantially consistent oxide removal rate (plus or minus two angstroms per second) is provided independent of whether an oxide or a nitride surface of a substrate assembly is being simultaneously polished. This is especially important in forming STI structures, as an underlying nitride layer of one substrate assembly may be exposed to polishing prior to an underlying nitride layer of another substrate assembly being simultaneously polished. Accordingly, a more consistent removal rate for oxide across simultaneous polishing of different substrate assemblies on a CMP system is provided. Notably, with such compensation in accordance with this embodiment of the present invention, lower incidence of scratching and dishing have been observed.

Notably, in accordance with this embodiment of the present invention, nitride removal rate is slowed by at least 50%. In particular, as indicated by comparing amounts of material removed for substrate assemblies D and D', nitride removal rate was slowed by approximately 59% when using this embodiment of the present invention. This is advantageous for a stop on nitride process as selectivity to nitride is increased. Accordingly, selectivity to nitride may be increased by approximately 50 percent or more. In particular, this is advantageous for a process where an underlying nitride layer is less than approximately 200 Å.

Figure 5:
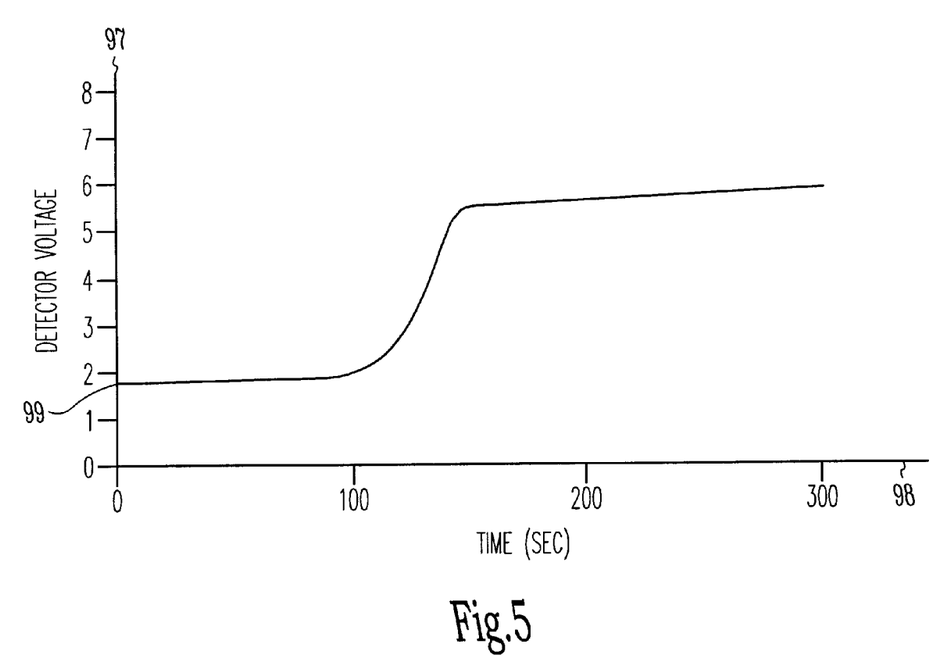
FIG. 5 is a graph of settling time ("settling rate") versus turbidity reciprocal for an exemplary embodiment of a polishing solution in accordance with the present invention.

Referring to FIG. 5, there is shown a graph of settling time ("settling rate") 98 versus detector voltage 97 for the above-described Corundum and Brij58 exemplary embodiment of a polishing solution in accordance with the present invention. Detector voltage 97 is proportional to the inverse of turbidity. FIG. 5 indicates that turbidity changes only slightly from 0 to about 110 seconds of settling time. At location 98, turbidity is about 100 percent. However, from about 110 seconds to about 150 seconds of settling time, turbidity changes significantly. After about 150 seconds of settling time, turbidity changes only slightly. Accordingly, for a turbidity in a range of about 100 to 50 percent, settling time should be under about 130 seconds for the above-mentioned exemplary embodiment.

The present invention has been particularly shown and described with respect to certain preferred embodiment(s). However, it will be readily appreciated to those of ordinary skill in the art that a wide variety of alternate embodiments, adaptations or variations of the preferred embodiment(s), and/or equivalent embodiments may be made without departing from the intended scope of the present invention as set forth in the appended claims. Accordingly, the present invention is not limited except as by the appended claims.

What is claimed is:

1. A polishing composition, comprising:

abrasive particles;

etchant; and surfactant, the polishing composition exhibiting a settling time of the abrasive particles in a range of approximately 0 to 60 minutes with a turbidity of the abrasive particles in a range of approximately 100 to 50 percent.

2. A polishing composition, comprising:

a slurry, the slurry including abrasive particles and etchant; and surfactant, the polishing composition exhibiting a settling time of the abrasive particles in a range of approximately 0 to 30 minutes with a turbidity of the abrasive particles in a range of approximately 100 to 50 percent.

3. A polishing composition, comprising:

abrasive particles;

etchant; and surfactant, the polishing composition exhibiting a settling time of the abrasive particles in a range of approximately 0 to 5 hours with a turbidity of the abrasive particles in a range of approximately 100 to 50 percent.

4. A polishing composition, comprising:

a chemical solution, the chemical solution comprising surfactant and etchant; and abrasive particles, the polishing composition exhibiting a settling time of the abrasive particles in a range of approximately 0 to 60 minutes with a turbidity of the abrasive particles in a range of approximately 100 to 50 percent.

5. A polishing composition, comprising:

a solution, the solution comprising surfactant and abrasive particles; and etchant, the polishing composition exhibiting a settling time of the abrasive particles in a range of approximately 0 to 2 minutes with a turbidity of the abrasive particles in a range of approximately 100 to 50 percent.

6. A process for mixing a polishing composition for chemical-mechanical polishing (CMP) of a substrate assembly, the process comprising:

providing abrasive particles;

providing etchant;

providing surfactant; and mixing of the abrasive particles, the etchant, and the surfactant proximate a polishing location to form the polishing composition exhibiting a settling time of the abrasive particles in a range of approximately 0 to 60 minutes with a turbidity of the abrasive particles in a range of approximately 100 to 50 percent.

7. The process of claim 1, wherein the surfactant is a nonionic composition.

8. The process of claim 1, wherein the surfactant is an ionic composition.

9. The process of claim 1, wherein the surfactant is a polyoxyethylene.

10. The process of claim 9, wherein the polyoxyethylene is an ether.

11. The process of claim 9, wherein the polyoxyethylene is an ester.

12. The process of claim 9, wherein the mixing is effected on a CMP pad.

13. The process of claim 9, wherein the mixing is effected in a feed-tube.

14. A process for mixing a polishing composition for chemical-mechanical polishing (CMP) of a substrate assembly, the process comprising:
providing abrasive particles; providing etchant;
providing surfactant;
mixing of the abrasive particles and the etchant to form a slurry; and
mixing the slurry and the surfactant proximate a polishing location to form the polishing composition exhibiting a settling time of the abrasive particles in a range of approximately 0 to 30 minutes with a turbidity of the abrasive particles in a range of approximately 100 to 50 percent.

15. The process of claim 14, wherein the surfactant is a polyoxyethylene.

16. The process of claim 15, wherein the slurry and the surfactant are separately pumped to a common feed-tube.

17. A process for mixing a polishing composition for chemical-mechanical polishing (CMP) of a substrate assembly with a CMP pad, the process comprising:
providing abrasive particles;
providing etchant;
providing surfactant;
mixing of the abrasive particles and the etchant to provide a slurry, and
mixing the slurry and the surfactant; and
dispensing the slurry and the surfactant mixture onto the CMP pad, the slurry and the surfactant mixture exhibiting a settling time of the abrasive particles in a range of approximately 0 to 30 minutes with a turbidity of the abrasive particles in a range of approximately 100 to 50 percent.

18. The process of claim 17, wherein the surfactant is a polyoxyethylene.

19. The process of claim 18, wherein the slurry and the surfactant are separately pumped to a common feed-tube.

20. A process for mixing a polishing composition for chemical-mechanical polishing (CMP) of a substrate assembly with a CMP pad, the process comprising:
providing abrasive particles;
providing etchant;
providing surfactant;
mixing of the abrasive particles, the surfactant and the etchant to form the polishing composition; and
dispensing the polishing composition onto the CMP pad, the polishing composition exhibiting a settling time of the abrasive particles in a range of approximately 0 minutes to 5 hours with a turbidity of the abrasive particles in a range of approximately 100 to 50 percent.

21. The process of claim 20, wherein the surfactant is a polyoxyethylene.

22. A process for mixing a polishing composition for chemical-mechanical polishing (CMP) of a substrate assembly with a CMP pad, the process comprising:
providing abrasive particles;
providing etchant;
providing surfactant;
mixing of the surfactant and the etchant to form a chemical solution; and
mixing the chemical solution and the abrasive particles proximate a polishing location to form the polishing composition with a settling time of the abrasive particles in a range of approximately 0 to 60 minutes with a turbidity of the abrasive particles in a range of approximately 100 to 50 percent.

23. The process of claim 22, wherein the surfactant is a polyoxyethylene.

24. The process of claim 23, wherein the chemical solution and the abrasive particles are separately pumped to a common feed-tube.

25. The process of claim 24, further including providing an aqueous solution with the abrasive particles.

26. The process of claim 25, further including in-line filtering the abrasive particles to limit maximum abrasive particle size.

27. A process for mixing a polishing composition for chemical-mechanical polishing (CMP) of a substrate assembly with a CMP pad, the process comprising:
providing abrasive particles;
providing etchant;
providing surfactant;
mixing of the surfactant and the abrasive particles to provide an abrasive particle-surfactant solution; and
mixing the abrasive particle-surfactant solution and the etchant proximate a polishing location to form the polishing composition exhibiting a settling time of the abrasive particles in a range of approximately 0 to 2 minutes with a turbidity of the abrasive particles in a range of approximately 100 to 50 percent.

28. The process of claim 27, wherein the surfactant is a polyoxyethylene.

29. The process of claim 27, wherein the abrasive particle-surfactant solution and the etchant particles are separately pumped to a common feed-tube.

30. A polishing solution for chemical-mechanical polishing, comprising:
etchant selective to nitride;
abrasive particles;
polyoxyethylene surfactant; and
the etchant, the abrasive particles, and the polyoxyethylene surfactant in an aqueous medium.

31. The polishing solution of claim 30, wherein the polyoxyethylene is an ester.

32. The polishing solution of claim 30, wherein the polyoxyethylene is an ether.

33. The polishing solution of claim 30, wherein the abrasive particles include ceria.

34. A method for chemical-mechanical polishing (CMP) a substrate assembly, comprising:
loading the substrate assembly into a CMP system, the CMP system having a polishing pad;
providing a polishing solution, the polishing solution comprising abrasive particles, etchant, and surfactant in an aqueous medium, the abrasive particles in the polishing solution exhibiting a settling rate in an approximate range of 0 to 110 seconds with a turbidity in an approximate range of 100 to 50 percent;
applying the polishing solution at a polishing interface between the polishing pad and the substrate assembly; and
providing displacement between the polishing pad and the substrate assembly.

35. The method of claim 34, wherein the surfactant is a polyoxyethylene ether.

36. The method of claim 35, wherein the polyoxyethylene ether is characterized by the formula:

$$CH_3(CH_2)_{17}-(OC_2H_5)_{20}-OH.$$

37. The method of claim 36, wherein the abrasive particles include ceria.

38. A method of forming an electrical isolation structure for a substrate assembly, comprising:

forming a chemical-mechanical polishing (CMP) stop layer extending over the uppermost surface;

etching the CMP stop layer and the uppermost surface to form a depressed region in the substrate assembly;

forming a CMP polish layer extending over the CMP stop layer and the depressed region;

loading the substrate assembly into a CMP system, the CMP system having a polishing pad;

providing a polishing solution, the polishing solution comprising abrasive particles, etchant, and surfactant in an aqueous medium, the abrasive particles in the polishing solution exhibiting a settling rate in an approximate range of 0 to 110 seconds with a turbidity in an approximate range of 100 to 50 percent;

applying the polishing solution at a polishing interface between the polishing pad and the CMP polish layer, and;

creating displacement between the polishing pad and the CMP polish layer to remove a sufficient portion of the CMP polish layer to expose at least a portion of the CMP stop layer.

39. The method of claim 38, wherein the surfactant is a polyoxyethylene ether characterized by the formula: $CH_3(CH_2)_{17}-(OC_2H_5)_{20}-OH$.

40. The method of claim 38, wherein the polishing slurry includes Brij58.

41. A method of polishing a plurality substrate assemblies simultaneously to obtain substantially consistent oxide removal rates independent of whether the surfaces to be polished are oxides or a combination of an oxide and a nitride, the method comprising:

loading the plurality of substrate assemblies into a chemical-mechanical polishing (CMP) system, the CMP system having a polishing pad;

providing a polishing solution, the polishing solution comprising abrasive particles, etchant, and surfactant in an aqueous medium, the abrasive particles in the polishing solution exhibiting a settling rate in an approximate range of 0 to 110 seconds with a turbidity in an approximate range of 100 to 50 percent;

applying the polishing solution at a polishing interface between the polishing pad and the surfaces to be polished; and creating displacement between the polishing pad and the surfaces to remove the oxide and the nitride or the oxides, the oxide removed at a rate similar to that for the oxides.

42. The method of claim 41, wherein the rate of removal for the oxide is within plus or minus two angstroms per second of that for the oxides.

43. The method of claim 42, wherein the oxides and the oxide include silicon.

44. The method of claim 43, wherein the nitride includes silicon.

45. The method of claim 44, wherein the nitride is less than approximately 200 angstroms thick.

46. The method of claim 41, wherein the nitride removal rate as compared to the oxide removal rate indicates an improvement in selectivity to nitride of approximately 50 percent or more over use of the polishing solution without the surfactant.

47. The method of claim 46, wherein the surfactant is a polyoxyethylene ether characterized by the formula: $CH_3(CH_2)_{17}-(OC_2H_5)_{20}-OH$.

48. The method of claim 46, wherein the polishing solution includes is Brij58.

49. The method of claim 46, wherein the oxide includes $SiO_2$, and the nitride includes $Si_3N_4$.

* * * * *

UNITED STATES PATENT AND TRADEMARK OFFICE
CERTIFICATE OF CORRECTION

PATENT NO.    : 6,544,435 B2
DATED         : April 8, 2003
INVENTOR(S)   : Robinson et al.

It is certified that error appears in the above-identified patent and that said Letters Patent is hereby corrected as shown below:

<u>Column 5,</u>
Line 32, insert -- . -- after "it".

<u>Column 8,</u>
Lines 58, 60 and 62, delete "1" after "claim" and insert -- 6 --, therefor.

Signed and Sealed this

Second Day of March, 2004

JON W. DUDAS
*Acting Director of the United States Patent and Trademark Office*